(12) United States Patent
Kawanabe

(10) Patent No.: US 8,038,362 B2
(45) Date of Patent: Oct. 18, 2011

(54) ASSEMBLY ERROR PREVENTION MEMBER AND UNIVERSAL JOINT HAVING SAME MEMBER

(75) Inventor: Akihisa Kawanabe, Yokohama (JP)

(73) Assignee: JTEKT Corporation, Osaka-shi (JP)

( * ) Notice: Subject to any disclaimer, the term of this patent is extended or adjusted under 35 U.S.C. 154(b) by 554 days.

(21) Appl. No.: 12/201,475

(22) Filed: Aug. 29, 2008

(65) Prior Publication Data
US 2009/0060637 A1   Mar. 5, 2009

(30) Foreign Application Priority Data
Aug. 31, 2007   (JP) ................. 2007-225973

(51) Int. Cl.
*F16C 11/06* (2006.01)
(52) U.S. Cl. ............... 403/11; 403/14; 403/57; 403/235
(58) Field of Classification Search ............. 403/11–14, 403/18, 21, 57, 235
See application file for complete search history.

(56) References Cited

U.S. PATENT DOCUMENTS

| | | | | |
|---|---|---|---|---|
| 6,739,790 B1 * | 5/2004 | Crudele | ......................... | 403/235 |
| 7,461,996 B2 * | 12/2008 | Kinme et al. | .................. | 403/234 |
| 2006/0204326 A1 * | 9/2006 | Kinme et al. | .................. | 403/290 |

FOREIGN PATENT DOCUMENTS

| | | |
|---|---|---|
| JP | 60-11717 | 1/1985 |
| JP | 11-505917 | 5/1999 |
| JP | 2006-226415 | 8/2006 |

* cited by examiner

*Primary Examiner* — Victor MacArthur
(74) *Attorney, Agent, or Firm* — Oblon, Spivak, McClelland, Maier & Neustadt, L.L.P.

(57) ABSTRACT

An assembly error prevention member includes a first plate portion that is attached to a first tab and a third plate portion that is inserted into a slit. The third plate portion has a blocking portion that inhibits a bolt from being tightened into a bolt hole and a driven portion that moves the blocking portion. The second plate portion has a first end portion connected to the first plate portion and a second end portion connected to the third plate portion. The second end portion is wider than the first end portion.

7 Claims, 8 Drawing Sheets

ASSEMBLY ERROR PREVENTION MEMBER AND UNIVERSAL JOINT HAVING SAME MEMBER

INCORPORATION BY REFERENCE

The disclosure of Japanese Patent Application No. 2007-225973 filed on Aug. 31, 2007 including the specification, drawings and abstract is incorporated herein by reference in its entirety.

BACKGROUND OF THE INVENTION

1. Field of the Invention

The invention relates to an assembly error prevention member and a universal joint that incorporates the assembly error prevention member.

2. Description of the Related Art

A conventional universal joint is generally includes a yoke body having a cylindrical portion in which an axially-extending slit is formed and having a first tab and a second tab that face each other across the slit. A shaft is inserted into the cylindrical portion of the yoke body of the universal joint and then clamped by the cylindrical portion when a bolt is inserted into a bolt through-hole of the first tab and then tightened into a bolt hole of the second tab. A curved recess is formed at a given axial position on the outer peripheral face of the shaft, and during assembly, the bolt is inserted through the recess, whereby the shaft is set in its target position. According to this universal joint, if the bolt is inserted into the bolt through-hole before the shaft reaches its target position, the front end of the bolt contacts the shaft, which prevents the bolt from being tightened into the bolt hole of the second tab. This prevents the shaft from being fastened to the yoke body of the universal joint when the shaft is not in the target position.

However, the bolt may also be tightened into the bolt hole of the second tab if the front end of the shaft has not been inserted to the position of the bolt, and this results in an assembly error of the universal joint. To counter this, for example, Published Japanese Translation of PCT application No. 11-505917 (JP-A-11-505917) describes the use of a wire to block the inserted bolt when the shaft has not been inserted to the target position. Further, Japanese Patent Application Publication No. 60-11717 (JP-A-60-11717) describes the use of an edge of a plate to block the inserted bolt when the shaft has not been inserted to the target position. According to these technologies, however, because of the small area of contact between the wire and the front end of the bolt and the small area of contact between the plate edge and the front end of the bolt, the bolt cannot be reliably blocked.

On the other hand, Japanese Patent Application Publication 2006-226415 (JP-A-2006-226415) describes the use of a plate to block the inserted bolt when the shaft has not been inserted to the target position. According to this technology, the front end of the bolt contacts one face of the plate, and therefore, the area of contact between the plate and the front end of the bolt is large, and the bolt can be reliably blocked.

According to the assembly error prevention member described in JP-A-2006-226415, a first plate portion of the plate, which is fixed to the yoke body of the universal joint, is connected to a fourth plate portion of the plate, which is disposed in the slit of the cylindrical portion of the yoke body of the universal joint, via a second plate portion and a third plate portion of the plate, which are connected to each other in a folded-back form. Therefore, when the fourth plate portion is raised by the insertion of the shaft into the cylindrical portion of the yoke body, a specific portion of the second plate portion or a specific portion of the third plate portion may be largely lifted up. Thus, a universal joint incorporating the assembly error prevention member according to JP-A-2006-226415 requires a large space for installation and thus is difficult to mount in a vehicle.

SUMMARY OF THE INVENTION

The invention relates to an assembly error prevention member that reliably prevents inappropriate fastening of a shaft and that may be easily mounted in a vehicle. The invention also relates to a universal joint that incorporates the assembly error prevention member.

The first aspect of the invention relates to an assembly error prevention member for a universal joint that includes a yoke body provided with a cylindrical portion in which an axially extending slit is formed and includes a first tab and a second tab that face each other across the slit; and a fastening member that fastens a shaft, which is inserted into the cylindrical portion in an axial direction of the cylindrical portion, to the cylindrical portion by bringing the first tab and the second tab closer to each other, the fastening member including a bolt that is tightened into a bolt hole of the second tab via a bolt through-hole of the first tab. The assembly error prevention member has: a first plate portion provided along an outer face of the first tab; a second plate portion bent from the first plate portion and extending toward the second tab; and a third plate portion bent from the second plate portion and disposed, at least partially, in the slit. The first plate portion has an attachment portion that is attached to the yoke body. The third plate portion has: a blocking portion that is movable between a blocking position, where the blocking portion blocks the front end of the bolt that is inserted into the bolt through-hole, to inhibit the bolt from being tightened into the bolt hole and a non-blocking position, where the blocking portion does not block the front end of the bolt, and a driven portion that moves the blocking portion to the non-blocking position when pushed by one end of the shaft. The second plate portion is elastic and elastically urges the blocking portion to the blocking position. The second plate portion has a first end connected to the first plate portion and a second end connected to the third plate portion. The width of the first end portion is smaller than the width of the second end portion.

According to the assembly error prevention member described above, before the shaft reaches the target position in the cylindrical portion of the yoke body, the front end of the bolt contacts the blocking portion of the third plate portion at the blocking position. Thus, the bolt is inhibited from being tightened into the bolt hole of the second tab, and therefore the shaft can not be fastened by the bolt. As such, it is possible to reliably prevent the shaft from being fastened to the yoke body when the shaft is not at the target position.

In contrast, as the inserted shaft approaches the target position in the cylindrical portion of the yoke body, the end of the shaft pushes the driven portion of the third plate, whereby the blocking portion moves to the non-blocking position, thereby allowing the bolt to be tightened into the bolt hole of the second tab. Accordingly, the shaft is set in the target position and properly fastened to the yoke body by the bolt.

According to the assembly error prevention member described above, because the second plate portion, via which the first plate portion having the attachment portion and the third plate portion having the blocking portion are connected to each other, is a single plate portion, when the third plate portion is lifted by the shaft, the second plate portion and the third plate portion are not lifted up excessively, and therefore the universal joint incorporating the assembly error prevention member may be easily arranged in a vehicle and thus is easily mounted in a vehicle. Meanwhile, when the first plate portion and the third plate portion are connected to each other via the second plate portion, there may arise a new issue that the load on the second plate portion tends to be relatively large. According to the assembly error prevention member of the invention, as the third plate portion is obliquely lifted by the shaft, the second plate portion deforms with respect to the first end portion of the second plate portion. Because the width of the first end portion of the second plate portion is relatively small, the second plate portion tends to deform entirely, and therefore stress does not concentrate at any specific point of the second plate portion.

The second aspect of the invention relates to a universal joint having: a yoke body provided with a cylindrical portion that has a slit extending in an axial direction and has a first tab and a second tab facing each other across the slit; a fastening member that fastens a shaft, which is inserted into the cylindrical portion in an axial direction of the cylindrical portion, to the cylindrical portion by bringing the first tab and the second tab closer to each other, wherein the fastening member includes a bolt that is tightened into a bolt hole of the second tab via a bolt through-hole of the first tab; and an assembly error prevention member that has a first plate portion provided along an outer side face of the first tab, a second plate portion bent from the first plate portion and extends toward the second tab, and a third plate portion bent from the second plate portion and disposed, at least partially, in the slit. The first plate portion has an attachment portion that is attached to the yoke body of the universal joint. The third plate portion has: a blocking portion that is moved between a blocking position, where the blocking portion blocks the front end of the bolt to inhibit the bolt from being tightened into the bolt hole, and a non-blocking position, where the blocking portion does not block the front end of the bolt inserted into the bolt through-hole; and a driven portion that moves the blocking portion to the non-blocking position when pushed by an end of the shaft inserted into the cylindrical portion. The second plate portion is elastic and elastically urges the blocking portion to the blocking position. The second plate portion has a first end portion connected to the first plate portion and a second end portion connected to the third plate portion. The width of the first end portion is smaller than the width of the second end portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
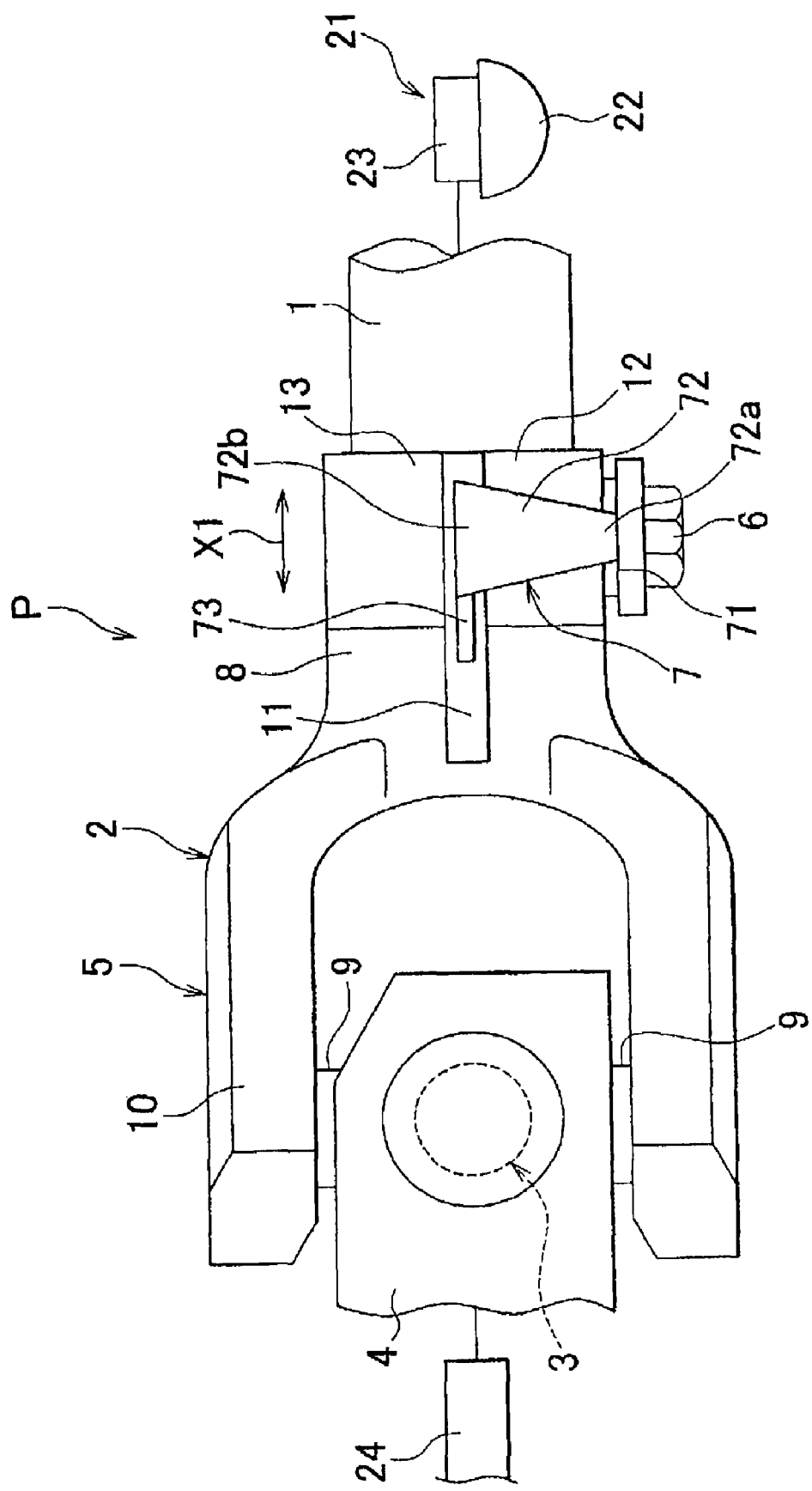
FIG. 1 is a plan view of a universal joint that incorporates an assembly error prevention member according to an embodiment of the invention and coupled with a pinion shaft.

FIG. 1 is a plan view of a universal joint P incorporating an assembly error prevention member according to an embodiment of the invention and coupled with a pinion shaft. Referring to FIG. 1, the pinion shaft 1 of a steering apparatus of an automobile is coupled with a universal joint yoke 2 of the universal joint P. The universal joint yoke 2 is connected to a universal joint yoke 4 through a cross shaft 3. The universal joint yoke 4 may be connected to, for example, an intermediate mediate shaft 24.

The universal joint yoke 2 has a yoke main body 5, a bolt 6 that serves to fasten the pinion shaft 1 to the yoke main body 5, and an assembly error prevention member 7. The assembly error prevention member 7 serves to prevent the bolt 6 from being tightened before the pinion shaft 1 is fully inserted to its target portion in the axial direction X1 of a cylindrical portion 8 when fastening the pinion shaft 1 to the cylindrical portion 8 of the yoke main body 5.

The pinion shaft 1 is inserted, in the axial direction X1, into the cylindrical portion 8 of the yoke main body 5 and is thus supported by the cylindrical portion 8. Further, the yoke main body 5 has a bifurcated portion 10 includes a pair of laterally-space legs at one end of the cylindrical portion 8. The legs of the bifurcated portion 10 support a pair of trunnions 9 of the cross shaft 3 via bearings (not shown in the drawings). A slit 11 is formed at the cylindrical portion 8 and extends in the axial direction X1. The yoke body 5 has a first tab 12 and a second tab 13 that face each other across the slit 11.

Figure 2:
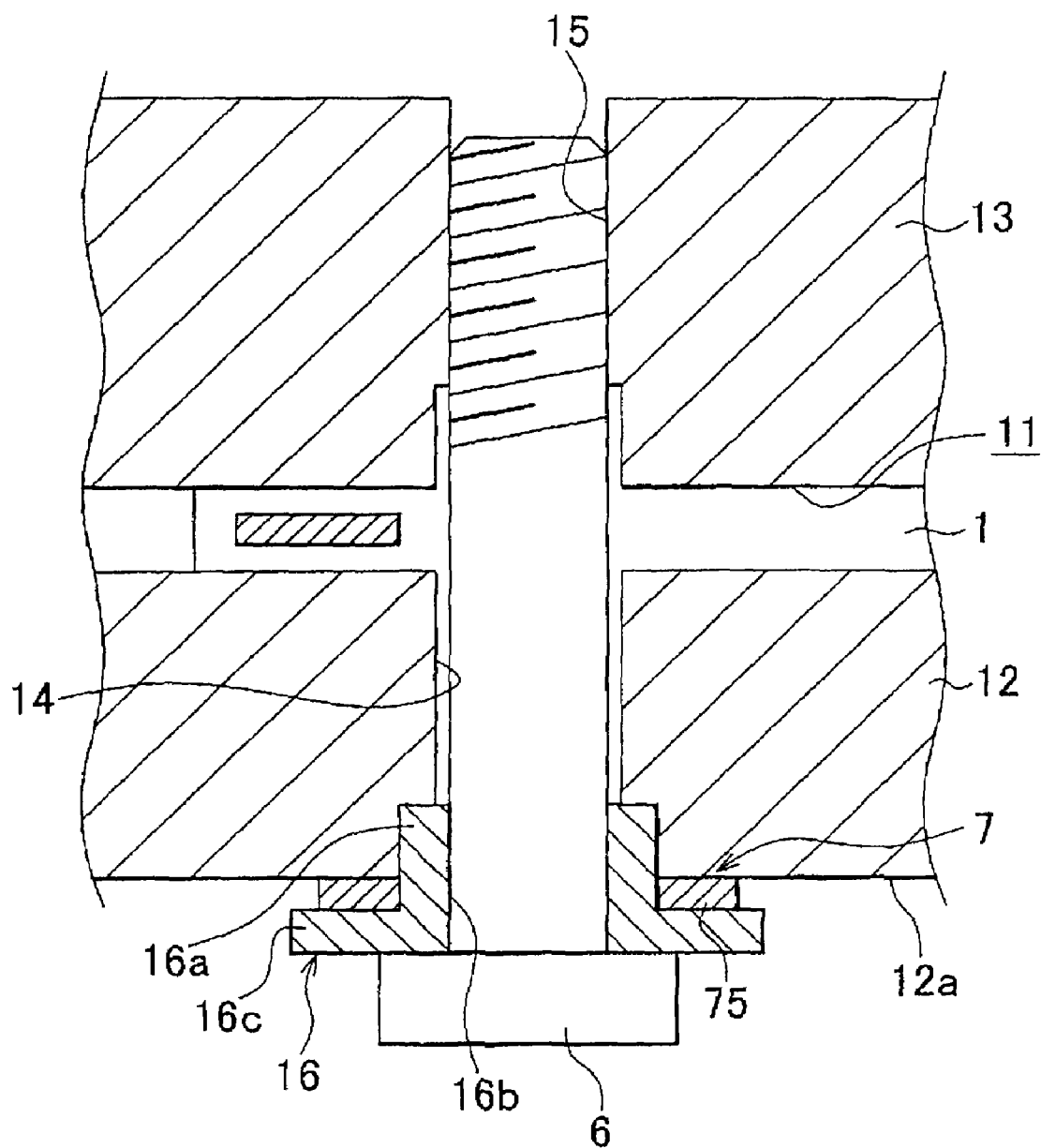
FIG. 2 is a cross-sectional view of a portion of the universal joint shown in FIG. 1.

Referring to FIG. 2, which is a cross-sectional view of a portion around the axis of the bolt 6, the bolt 6 is tightened into a bolt hole 15 of the second tab 13 through a bolt through-hole 14 of the first tab 12. As the bolt 6 is thus tightened, the first and second tabs 12 and 13 are brought closer to each other, so that the diameter of the cylindrical portion 8 decreases. Thus, the pinion shaft 1 is clamped by and fixed to the cylindrical portion 8.

A sleeve 16a of a fixing member 16 is pressed into the inlet of the bolt through-hole 14 of the first tab 12. The fixing member 16 serves to fix an annular attachment portion 75 of the assembly error prevention member 7, which will be described later, along the outer side surface 12a of the first tab 12. The sleeve 16a has a bolt through-hole 16b into which the bolt 6 is inserted. The fixing member 16 has an annular flange 16c at one end of the sleeve 16a. The attachment portion 75 is fit to the outer periphery of the sleeve 16a and sandwiched between the annular flange 16c and the outer side surface 12a of the first tab 12.

Figure 3:
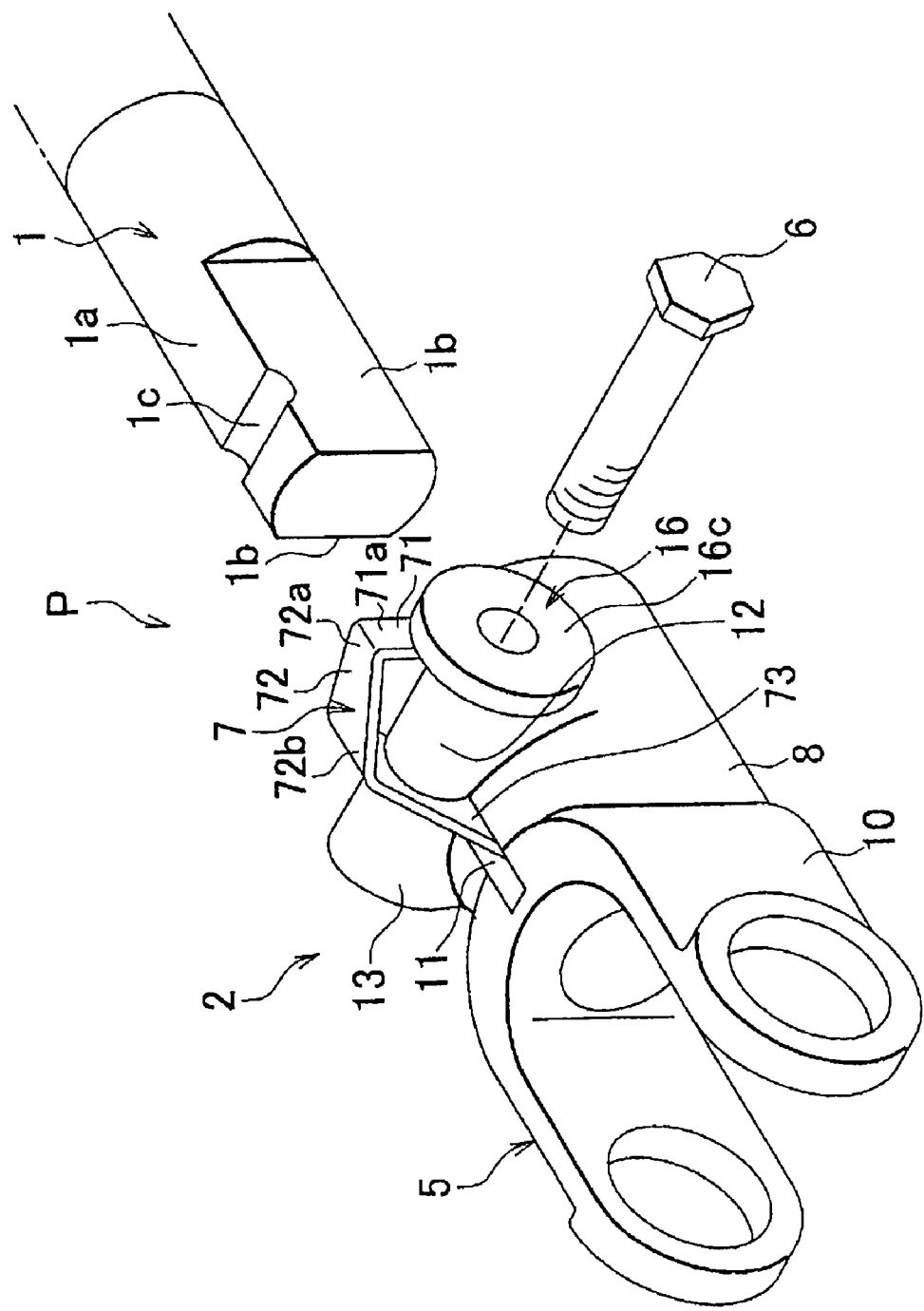
FIG. 3 is an exploded perspective view of the universal joint shown in FIG. 1.

Referring to FIG. 3, which is an exploded perspective view of the universal joint P, the outer peripheral face of one end 1a of the pinion shaft 1 includes a pair of flat portions 1b opposed to each other. At the outer peripheral face of the end portion 1a of the pinion shaft 1, a recess groove 1c for the bolt 6 is formed perpendicular to the flat portions 1b. Although not shown in the drawings, the cross-sectional shape of the hole of the cylindrical portion 8 into which the pinion shaft 1 is inserted complements the cross-sectional shape of the end portion 1a of the pinion shaft 1. Thus, once the pinion shaft 1 has been inserted into the cylindrical portion 8 during assembly, the pinion shaft 1 and the cylindrical portion 8 can no longer be rotated relative to each other.

Figure 4:
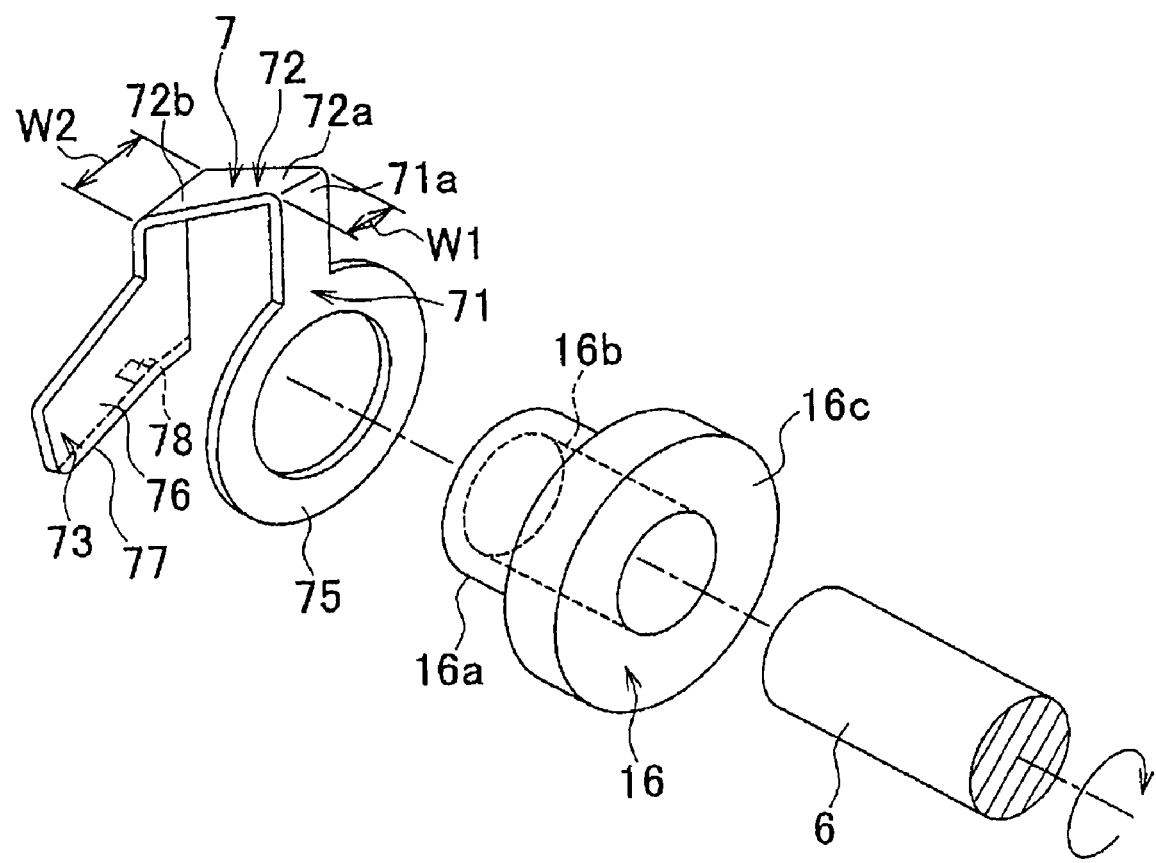
FIG. 4 is an exploded perspective view of a portion of the universal joint shown in FIG. 1.

Referring to FIG. 4, the assembly error prevention member 7 is made from a single steel plate only and has a predetermined elasticity. Referring to FIG. 1, FIG. 3, FIG. 4, and FIG. 5, the assembly error prevention member 7 has a first plate portion 71, a second plate portion 72, and a third plate portion 73. The first plate portion 71 is fixed along the outer side surface 12a of the first tab 12. Referring to FIG. 2 and FIG. 4, the first plate portion 71 has the annular attachment portion 75 that is attached to the outer side surface 12a of the first tab 12 by being pressed by the annular flange 16c of the fixing member 16.

Figure 5:
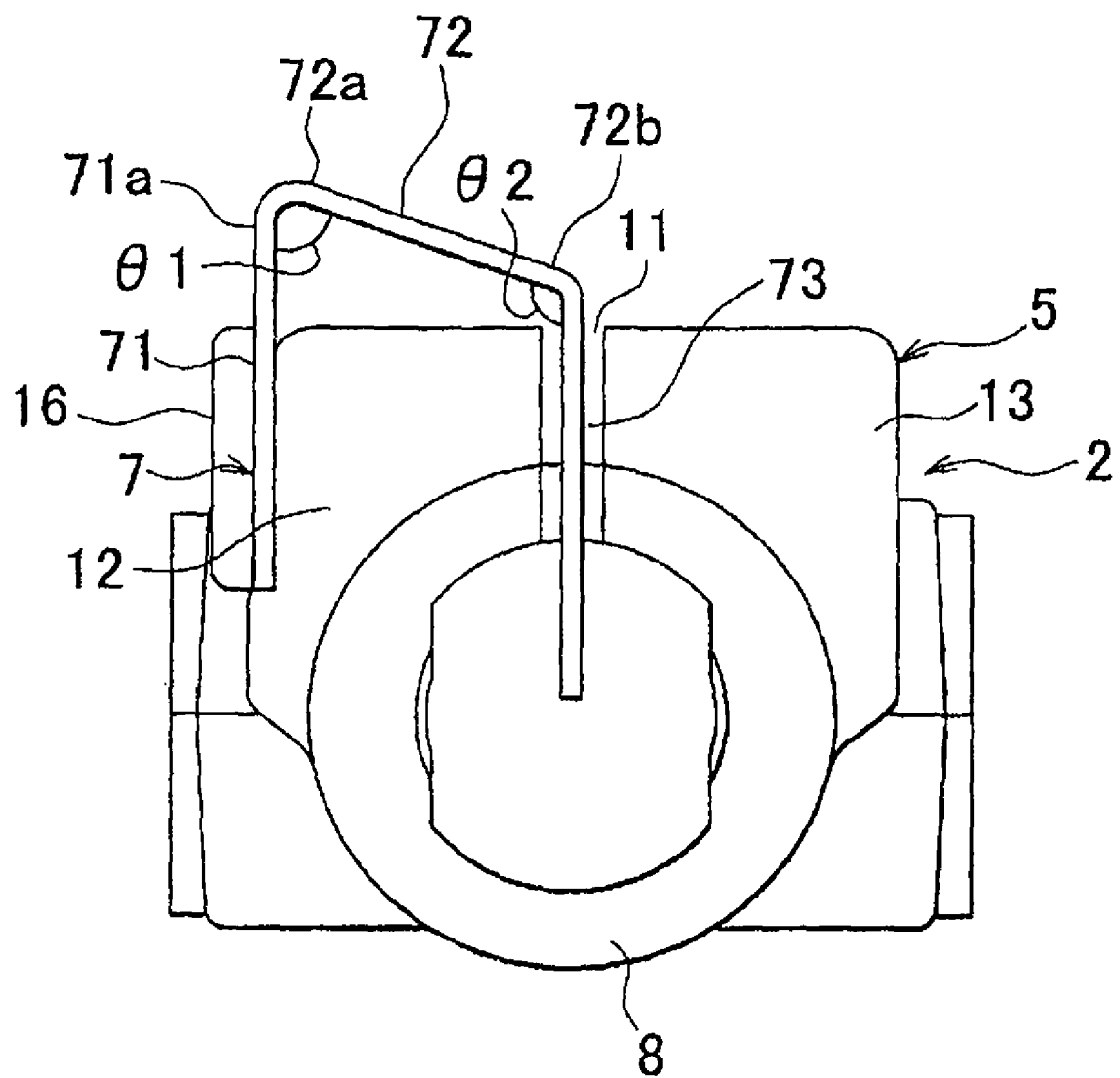
FIG. 5 is a view schematically showing the coupling structure between the universal joint and the pinion shaft as viewed in the axial direction of the cylindrical portion of the yoke body of the universal joint.

Referring to FIG. 4 and FIG. 5, the second plate portion 72 is bent at an end portion 71a of the first plate portion 71 and extends toward the second tab 13. As shown in FIG. 5, the angle θ1 between the first plate portion 71 and the second plate portion 72 is acute. The second plate portion 72 has an end portion 72a connected to the first plate portion 71 and an end portion 72b connected to the third plate portion 73. The width W1 of the first end portion 72a is smaller than the width W2 of the second end portion 72b (W2>W1). That is, the width of the second plate portion 72 gradually decreases from the second end portion 72b to the first end portion 72a.

Figure 6A:
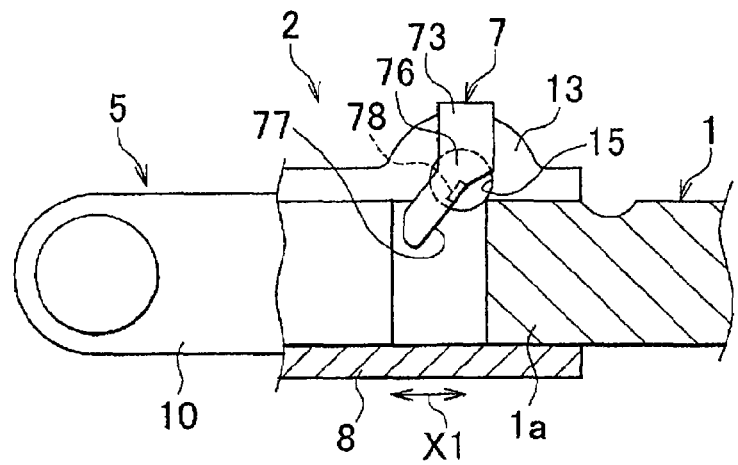
FIG. 6A is a cross-sectional view of the coupling structure between the universal joint and the pinion shaft when the pinion shaft has been inserted but has not reached the target position.
Figure 6B:
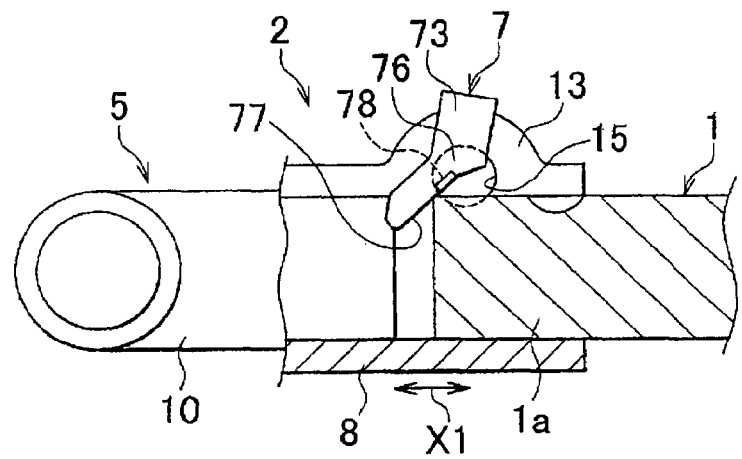
FIG. 6B is a cross-sectional view of the coupling structure between the universal joint and the pinion shaft as inserted the pinion shaft approaches the target position.

The third plate portion 73 is bent at an obtuse angle from the second end portion 72b of the second plate portion 72 and is arranged in the slit 11. The third plate portion 73 has a blocking portion 76 that is movable, under certain conditions, between a position at which the blocking portion 76 blocks insertion of the bolt 6 (see FIG. 6A), which will be referred to as "blocking position", and a position at which the blocking portion 76 does not block insertion of the bolt 6 (see FIG. 6C), which will be referred to as "non-blocking position". Referring to FIG. 4 and FIG. 6B, further, the third plate portion 73 has a driven portion 77 that moves the blocking portion 76 to the non-blocking position when pushed by the end of the pinion shaft 1 as it is inserted into the cylindrical portion 8. The driven portion 77 is formed by a slanted edge of the third plate portion 73.

Figure 7A:
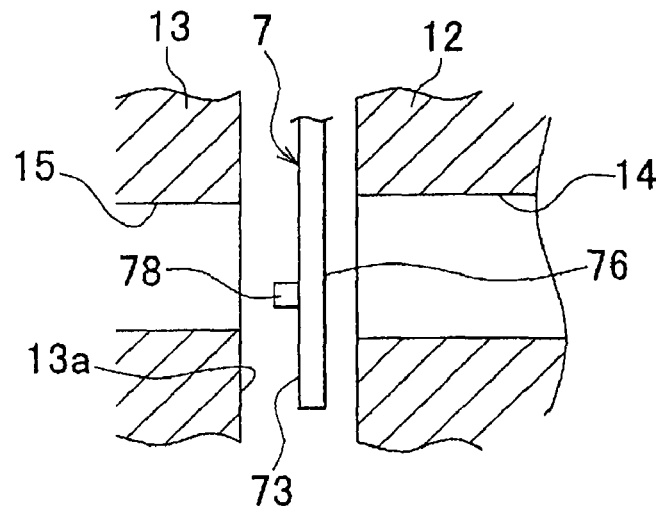
FIG. 7A to FIG. 7C are cross-sectional views of the coupling structure between the universal joint and the pinion shaft, each illustrating how the projection of the assembly error prevention member works to prevent an assembly error.

Referring to FIG. 4 and FIG. 7A, a projection 78 is provided at an edge of the third plate portion 73. The projection 78 is bent from the edge toward the bolt hole 15 of the second tab 13. According to this example embodiment of the invention, when the pinion shaft 1 is inserted into the cylindrical portion 8 but has not reached target position in the axial direction X1 as shown in FIG. 6A, the blocking portion 76 remains at the blocking position and thus overlaps the bolt hole 15 of the second tab 13 as viewed from the direction in which the bolt 6 is inserted. Therefore, even if the bolt 6 is inserted through the bolt through-hole 14 of the first tab 12, the front end of the bolt 6 contacts the blocking portion 76 in the blocking position, whereby the bolt 6 is inhibited from being tightened into the bolt hole 15 of the second tab 13 and thus the pinion shaft 1 is inhibited from being fixed by the bolt 6. As such, it is possible to reliably prevent the pinion shaft 1 from being fastened to the yoke body 5 when it is not at the target position.

Figure 6C:
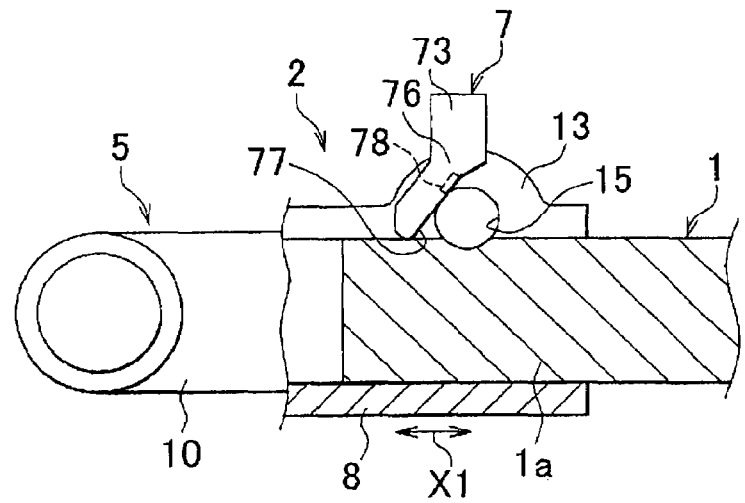
FIG. 6C is a cross-sectional view of the coupling structure between the universal joint and the pinion shaft when the pinion shaft has reached the target position.

Once the pinion shaft 1 has reached the target position as shown in FIG. 6C, the end portion 1a of the pinion shaft 1 pushes the driven portion 77 of the assembly error prevention member 7 as shown in FIG. 6B. Thus, the blocking portion 76 of the assembly error prevention member 7 moves to the non-blocking position shown in FIG. 6C, which allows the bolt 6, inserted into the bolt through-hole 14 of the first tab 12, to be tightened into the bolt hole 15. As such, the pinion shaft 1 is set in the target position and properly fastened to the yoke body 5 by the bolt 6.

According to the above-described structure, because the second plate portion 72, via which the first plate portion 71 is connected to the third plate portion 73, is a single plate portion, when the third plate portion 73 is lifted up by the pinion shaft 1, the second plate portion 72 and the third plate portion 73 are not lifted up excessively, and therefore the universal joint P can be easily arranged in a vehicle and thus may be easily mounted in a vehicle.

However, because the first plate portion 71 and the third plate portion 73 are connected to each other via the second plate portion 72 that is a single plate portion as described above, there may arise a new issue that the load on the second plate portion 72 tends to be relatively large. The above-described structure of the example embodiment, however, prevents stress concentration on the second plate portion 72 as follows. That is, as the third plate portion 73 is obliquely lifted up by the pinion shaft 1, the second plate portion 72 deforms with respect to the first end portion 72a connected to the first plate portion 71 having the annular attachment portion 75. At this time, because the width W1 of the first end portion 72a is smaller than the width W2 of the second end portion 72b, the second plate portion 72 tends to deform entirely, and therefore stress does not concentrate at any specific point of the second plate portion 72.

Further, because the second plate portion 72 is slanted with respected to the first plate portion 71 and to the third plate portion 73, that is, because the joint angle θ1 between the first plate portion 71 and the second plate portion 72 is acute and the joint angle θ2 between the second plate portion 72 and the third plate portion 73 is obtuse, the third plate portion 73 protrudes only a short distance above the slit 11 when the pinion shaft 1 is not inserted, and therefore, when the third plate portion 73 is obliquely lifted up due to the insertion of the pinion shaft 1, the turning radius of the third plate portion 73 is small. Thus, even when the third plate portion 73 is lifted up by the pinion shaft 1, the third plate portion 73 does not protrude from the slit 11 excessively, and therefore the second plate portion 72 and the third plate portion 73 are not lifted up excessively. Thus, the universal joint P may be easily mounted in a vehicle.

Further, because the entire part of the assembly error prevention member 7 is formed by sheet-metal, the production cost of the assembly error prevention member 7 is low. Moreover, the assembly error prevention member 7 formed by sheet-metal has an elasticity to elastically urge the blocking portion 76 to the blocking position, and this provides the following advantage. That is, if the pinion shaft 1 is removed from the universal joint yoke 2 for maintenance, or the like, the blocking portion 76 of the assembly error prevention member 7 is automatically returned to the blocking position, and therefore the pinion shaft 1 is prevented from being inappropriately fastened to the universal joint yoke 2 during reassembly of the universal joint.

Figure 7B:
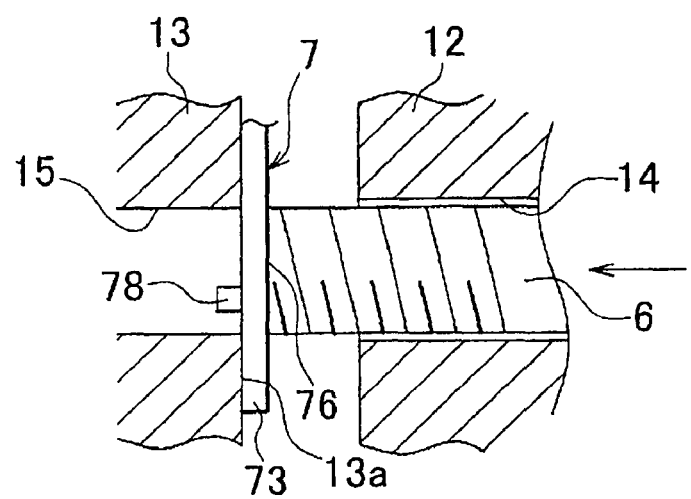
Figure 7C:
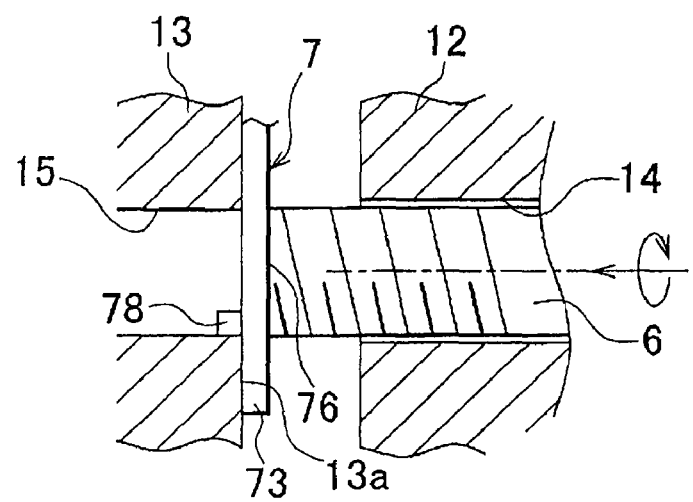

Further, the projection 78 further increases the reliability in preventing inappropriate fastening of the pinion shaft 1 as follows. As the blocking portion 76 at the blocking position shown in FIG. 6A and FIG. 7A is pressed against an inner side face 13a of the second tab 13 by the front end of the bolt 6 as shown in FIG. 7B, the projection 78 enters the bolt hole 15 of the second tab 13. Thus, even if the bolt 6 is turned and rotational torque is applied from the front end of the bolt 6 to the blocking portion 76, the projection 78 is caught at an edge of the bolt hole 15 of the second tab 13, thereby inhibiting the blocking portion 76 from moving to a non-blocking position. As such, inappropriate fastening of the pinion shaft 1 is reliably prevented.

Figure 8:
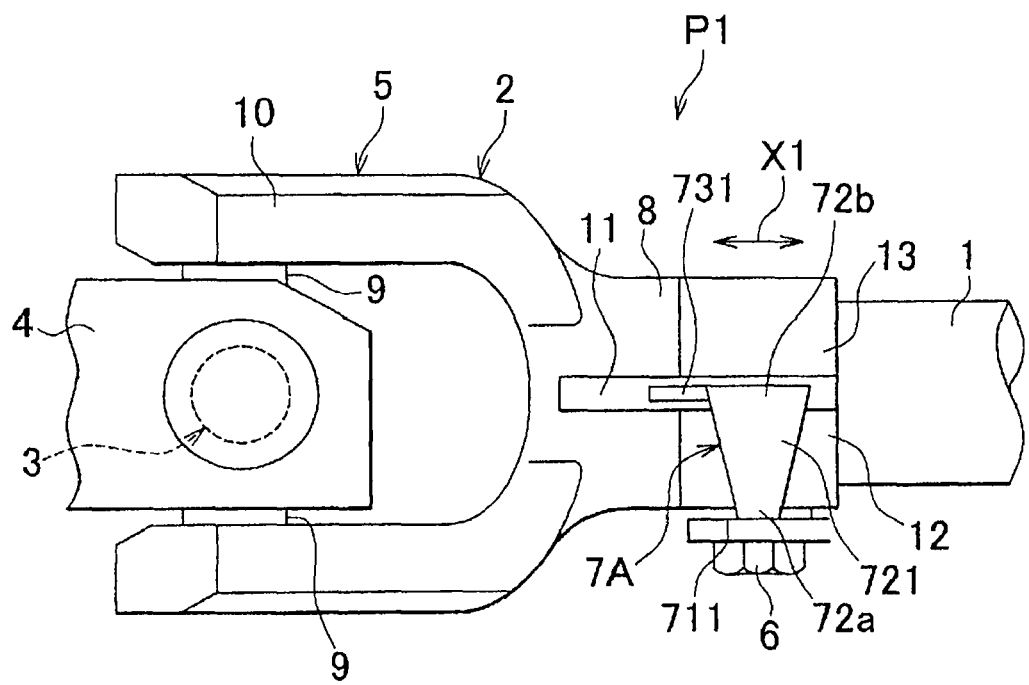
FIG. 8 is a plan view of a universal joint incorporating an assembly error prevention member according to another embodiment of the invention and coupled with a pinion shaft.
Figure 9:
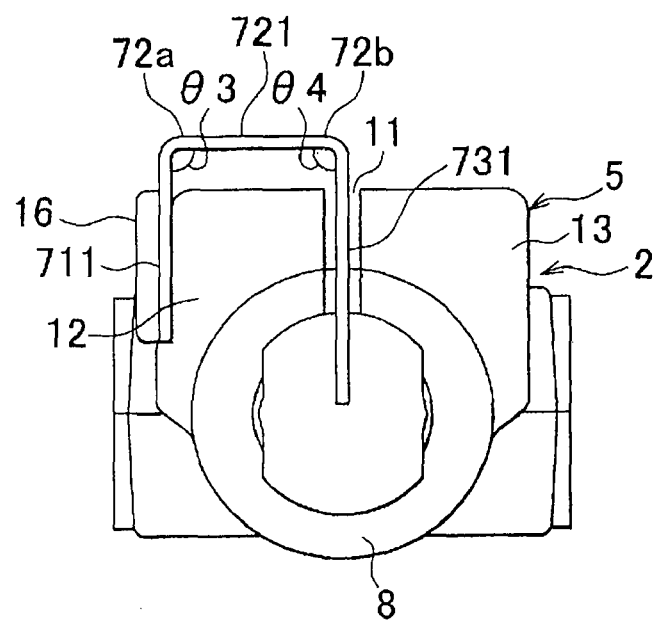
FIG. 9 is a view schematically showing the coupling structure between the universal joint and the pinion shaft shown in FIG. 8 as viewed in the axial direction of the cylindrical portion of the yoke body of the universal joint.

Next, another example embodiment of the invention will be described with reference to FIG. 8 and FIG. 9. Referring to FIG. 8 and FIG. 9, a universal joint P1 of this example embodiment of the invention differs from the universal joint P of the preceding example embodiment in that an assembly error prevention member 7A is used in place of the assembly error prevention member 7. The assembly error prevention member 7A has a first plate portion 711, a second plate portion 721, and a third plate portion 731. The second plate portion 721 is perpendicular to the first plate portion 711 and the third plate portion 731. That is, the joint angle θ3 between the first plate portion 711 and the second plate portion 721 is 90°, and the joint angle θ4 between the second plate portion 721 and the third plate portion 731 is also 90°. Note that other structures employed in this example embodiment are identical to those employed in the preceding example embodiment and therefore they are denoted using the same reference numerals and their descriptions are omitted. It is also possible to prevent the second plate portion 721 and the third plate portion 731 from being lifted up excessively in this example embodiment, and still allow the universal joint P1 to be easily mounted in a vehicle.

The invention is not limited to any of the foregoing example embodiments. For example, the projection 78 may be omitted if appropriate. Further, the pinion shaft 1 and the cylindrical portion 8 may be splined to each other to prevent relative rotation between the pinion shaft 1 and the cylindrical portion 8. Further, the assembly error prevention member 7 may be secured to the yoke body 5 using screws, bolts, or the like. Further, the universal joint of the invention may be used as a coupling between an end of an intermediate shaft and an end of a spline shaft.

What is claimed is:

1. An assembly error prevention member for a universal joint that includes a yoke body provided with a cylindrical portion having a slit extending in an axial direction and having a first tab and a second tab facing each other across the slit; a fixing member having an annular flange and a through-hole in a sleeve that extends into a bolt through-hole of the first tab, and a fastening member that fastens a shaft that is inserted into the cylindrical portion in an axial direction of the cylindrical portion, to the cylindrical portion by bringing the first tab and the second tab closer to each other, the fastening member including a bolt that is tightened into a bolt hole of the second tab via the bolt through-hole of the first tab and the through-hole of the fixing member, the bolt being engaged with a groove formed in the shaft, the assembly error prevention member comprising:
a first plate portion provided along an outer face of the first tab;
a second plate portion bent from the first plate portion and extending toward the second tab; and
a third plate portion bent from the second plate portion and disposed, at least partially, in the slit, the first plate portion and the third plate portion being substantially parallel to each other, wherein:
the first plate portion has an attachment portion that is attached to the yoke body;
the third plate portion includes: a blocking portion that moves between a blocking position, where the blocking portion blocks the front end of the bolt to inhibit the bolt from being inserted into the bolt hole, and a non-blocking position, where the blocking portion does not block the front end of the bolt; and a driven portion that moves the blocking portion to the non-blocking position when pushed by one end of the shaft that is inserted into the cylindrical portion;
the second plate portion is elastic and elastically urges the blocking portion to the blocking position;
the second plate portion has a first end portion that is connected to the first plate portion and a second end portion that is connected to the third plate portion; and
the second end portion is wider than the first end portion.

2. The assembly error prevention member according to claim 1, wherein:
the second plate portion is connected at an acute angle to the first plate portion; and
the second plate portion is connected at an obtuse angle to the third plate portion.

3. The assembly error prevention member according to claim 1, further comprising:
a projection, provided on the third plate portion, that enters the bolt hole of the second tab and is caught at an edge of the bolt hole to restrict movement of the blocking portion when the front end of the bolt pushes against an inner face of the second tab to move the blocking portion from the blocking position.

4. The assembly error prevention member according to claim 1, wherein:
the second plate portion is connected at a right angle to the first plate portion; and
the second plate portion is connected at a right angle to the third plate portion.

5. The assembly error prevention member according to claim 1, wherein the first plate portion and the third plate portion are parallel to each other.

6. The assembly error prevention member according to claim 1, wherein the second plate portion extends downwardly from the first end portion to the second end portion.

7. A universal joint having:
a yoke body provided with a cylindrical portion having a slit extending in an axial direction and having a first tab and a second tab facing each other across the slit;
a fixing member having an annular flange and a through-hole in a sleeve that extends into a bolt through-hole of the first tab;
a fastening member that fastens a shaft that is inserted into the cylindrical portion in an axial direction of the cylindrical portion, to the cylindrical portion by bringing the first tab and the second tab closer to each other, the fastening member including a bolt that is tightened into a bolt hole of the second tab via the bolt through-hole of the first tab and the through-hole of the fixing member, the bolt being engaged with a groove formed in the shaft; and
an assembly error prevention member comprising: a first plate portion provided along an outer face of the first tab; a second plate portion bent from the first plate portion and extending toward the second tab; and a third plate portion bent from the second plate portion and disposed, at least partially, in the slit, the first plate portion and the third plate portion being substantially parallel to each other, wherein:

the first plate portion has an attachment portion that is attached to the yoke body of the universal joint;

the third plate portion includes: a blocking portion that moves between a blocking position, where the blocking portion blocks the front end of the bolt to inhibit the bolt from being tightened into the bolt hole, and a non-blocking position, where the blocking portion does not block the front end of the bolt; and a driven portion that moves the blocking portion to the non-blocking position pushed by one end of the shaft that is inserted into the cylindrical portion;

the second plate portion is elastic and elastically urges the blocking portion to the blocking position;

the second plate portion has a first end portion that is connected to the first plate portion and a second end portion that is connected to the third plate portion; and the second end portion is wider than the first end portion.

* * * * *